(No Model.)
2 Sheets—Sheet 1.

W. L. LIGHTFORD.
PHOTOGRAPHIC CAMERA SHUTTER.

No. 517,164.
Patented Mar. 27, 1894.

WITNESSES:
H. D. Nealy
K. D. Tilford

INVENTOR
Wm. L. Lightford
BY V. H. Lockwood
His ATTORNEY.

THE NATIONAL LITHOGRAPHING COMPANY,
WASHINGTON, D. C.

(No Model.) 2 Sheets—Sheet 2.

W. L. LIGHTFORD.
PHOTOGRAPHIC CAMERA SHUTTER.

No. 517,164. Patented Mar. 27, 1894.

WITNESSES:
H. D. Nealy.
N. D. Tilford.

INVENTOR
Wm L. Lightford,
BY V H Lockwood
His ATTORNEY.

UNITED STATES PATENT OFFICE.

WILLIAM L. LIGHTFORD, OF INDIANAPOLIS, INDIANA.

PHOTOGRAPHIC-CAMERA SHUTTER.

SPECIFICATION forming part of Letters Patent No. 517,164, dated March 27, 1894.

Application filed April 3, 1893. Serial No. 468,946. (No model.)

*To all whom it may concern:*

Be it known that I, WILLIAM L. LIGHTFORD, a citizen of the United States, residing at Indianapolis, in the county of Marion and State of Indiana, have invented a new and useful Improvement in Photographic-Camera Shutters, of which the following is a specification.

My invention relates more especially to that class of cameras known commonly as hand, or detective cameras, and its object is to provide a shutter acting mechanism which shall be at once simple, cheap of construction and which shall avoid some of the imperfections common to shutters of its class but more especially to provide a means of actuating the shutter which will exert its greatest motive force at the beginning of the operation, and after the beginning of the operation the motive force will remain substantially the same during the remainder of the operation. To accomplish this object I have invented the device described in this specification, of which the accompanying drawings form a part.

Similar letters on the drawings and in text refer to similar parts of the mechanism.

In most of the shutters of this class of which I have knowledge, the direction of the actuating force is a straight line, while the movement of the shutter is rotary. In such an arrangement the force of the spring is not applied in a direct ratio to the amount of resistance to be overcome. In many cases the power to rotate or move the shutter is exerted in the direction of its pivotal point, or nearly so, at the beginning of the movement, so that much power is lost and the movement is not quick. Experience has demonstrated that better results are obtained when the full force of the spring is applied to the shutter at the moment of its release from the restraining trigger, in order that the inertia may be more quickly overcome. It is evident that as the moving shutter gains momentum, less force is required to propel it, therefore the spring power should gradually decrease. It is to obtain a more equal distribution of spring power that I have invented the mechanism shown in these drawings, in which—

Figure 1:
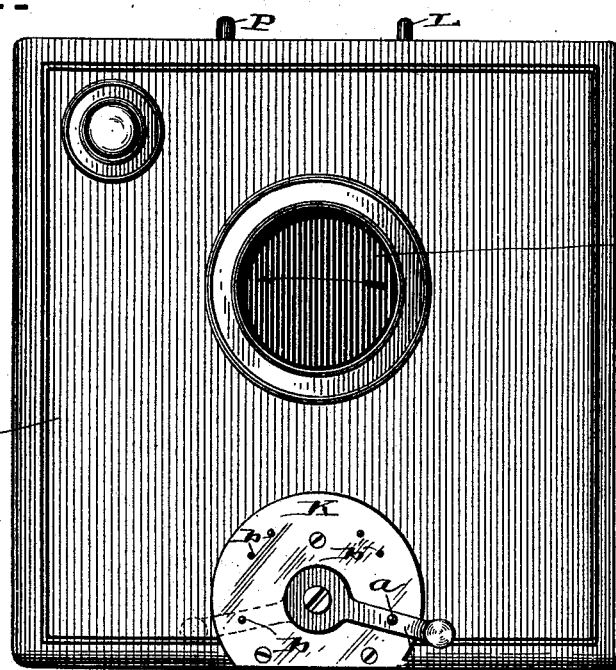
Figure 2:
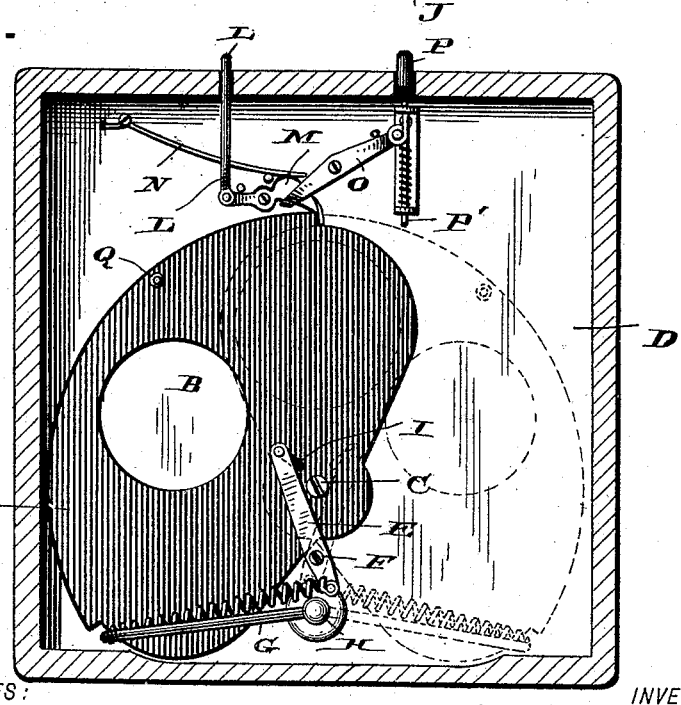
Figure 3:
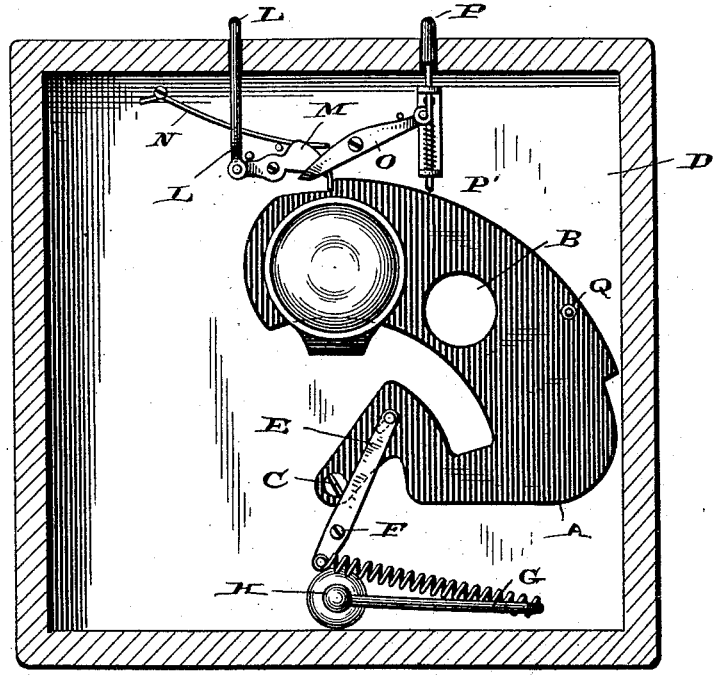
Figure 4:
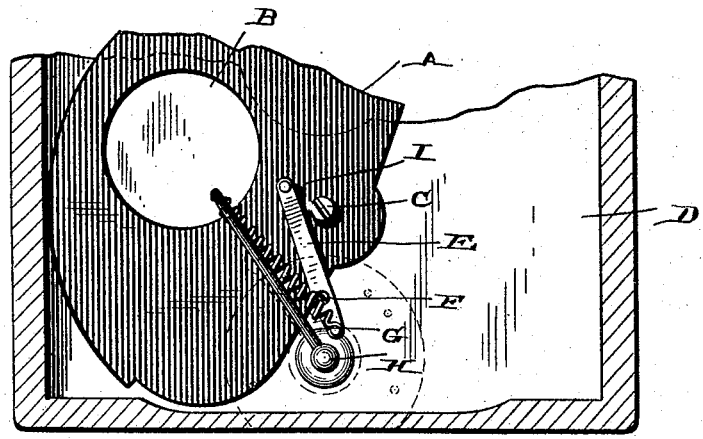

Figure 1 is a front elevation of the exterior of a hand camera. Fig. 2 is an interior view of the same, showing the arrangement of the shutter. Fig. 3 is a modification of the device, showing it applied to a shutter operating between the lenses. Fig. 4 is a view of a portion of shutter and interior of the camera front.

A is the shutter plate or shield, which may be made of hard rubber or any other suitable material.

B is the exposure aperture, cut through the shutter plate.

C is the pivot by which the shutter plate is loosely pivoted to the front D.

E is a lever, loosely pivoted to the camera front at F; to the lower end of this lever is attached a spiral extension spring as shown, and the other end of this spring is attached to the bent end of a lever G; the spring is thus suspended between these two points. The upper end of the lever E is provided with a projecting stud which operates in a slot I in the shutter plate, as shown.

H is a post which projects through, and is free to rotate in, the front board D. To one end of this post is secured the lever G; to the other and outer end is attached a lever J (Fig. 1) which lies against a plate K which is secured to the outside of the camera front. The lever J is provided with a projection $a$ which engages the holes $b$ $b$ $b$ $b$ $b$ in the plate K as shown.

M is the shutter restraining trigger; it is operated by the push rod L and held in engagement with the shutter by the spring N.

P is a spring supported push rod that is used exclusively for making time exposures wherein it is necessary to hold the shutter open for a definite period of time.

O is a loosely pivoted lever connecting P and M.

Q is an outwardly projecting stud affixed to the shutter and its office is to engage with the point P' when making time exposures.

When all of the members are in the position shown in Fig. 2 the shutter is set, ready for action; if the push rod L be depressed, the engaging end of the trigger M will be freed from the shutter and the force of the retraction of the spring, operating through the lever E, will cause the shutter to assume the position shown in the dotted lines; during its transit the opening B of the shutter plate, passes in front of the lenses, or between them as the case may be, and the exposure is made.

It will be observed that when the shutter is set as shown, the inwardly projecting stud at the upper end of the lever E is in the upper end of the slot I in the shutter plate. In this position it is at its farthest distance from the central pivot of the shutter plate; thus the motive force is applied at the starting of the shutter through the longest possible lever, and is greatest when most needed to overcome the inertia at starting. As the momentum of the moving shutter increases, this leverage decreases until the shutter is mid-way in its transit, at which point the leverage is shortest; as the shutter goes on past this point, and the actuating force of the spring lessens by reason of its contraction, the leverage again lengthens until the shutter comes to a stop, at which point it has resumed its original length, ready for the next action. To reset the shutter, the outer lever J is thrown over to the opposite side of the plate K; as this is done the lever G within the camera, carries the motor spring to the opposite side of the center F, where it is again ready for action.

The shutter speed may be regulated accordingly as the lever J is engaged with one or other of the holes b b b b b in the plate K. When set to the extreme hole at either end of the series of holes the shutter is at its fastest speed. If slower speed is desired the lever is engaged with one of the inner holes of the series, the speed being slower as the lever is set nearer to the center.

To make a "time" exposure with this camera I proceed as follows: The shutter spring being first set ready to operate the shutter, the camera is placed firmly on a tripod, table or other support, and after the view is properly located upon the view finder or ground glass in the usual manner, I depress the push rod P. By depressing this rod the trigger M is lifted through the medium of the lever O; the shutter being then freed it will move until the stud Q, which is affixed to it, is intercepted by the lower end P' of the push rod P. This interception takes place at a point where the exposure opening of the shutter is directly in line with the lens, and the shutter is thus held open as long as the stud and push rod are kept engaged. When it is desired to end the exposure the push rod is released, and is withdrawn from contact with the stud by means of a small spiral spring within which the push rod moves, all as shown in Figs. 2 and 3. When the contact of rod and stud ceases, the shutter is free to continue its motion and close the aperture. When the push rod for instantaneous exposures is used, the trigger M is free to operate without engaging the lever O, or the push rod for timed exposures.

It is evident that the shutter acting mechanism herein shown may be applied, by a modification of its members, to shutters which oscillate or vibrate about a central pivot, as the ones shown, or it may be applied to shutters having a reciprocating rectilinear motion, either horizontal or vertical; I therefore do not confine my invention to the particular form shown.

I make no claim to the arrangement of triggers and push rods but

What I do claim as new, and desire to protect by Letters Patent, is—

A camera shutter mechanism consisting of a shutter plate pivoted to the camera casing and provided with a slot in line with the pivotal point and the center of the exposure opening of the shutter plate in the middle of its movement, a catch adapted to hold the shutter plate at its limit of movement, an actuating lever pivoted to the camera casing and at one end loosely engaging the shutter plate in such slot, a bent lever mounted in the camera casing and provided with a handle on the outside and an arm on the inside of the casing, and a spiral spring attached to the end of such arm and to the actuating lever and adapted to operate such lever when such catch is released, substantially as shown and described.

In witness whereof I have hereunto set my hand, at Indianapolis, Indiana, this 30th day of February, A. D. 1893.

WILLIAM L. LIGHTFORD.

Witnesses:
FREDERICK A. HETHERINGTON,
HERMAN F. GARTH.